(12) United States Patent
Wu et al.

(10) Patent No.: US 8,050,030 B2
(45) Date of Patent: Nov. 1, 2011

(54) ELECTRONIC DEVICE

(75) Inventors: Wei Wu, Shenzhen (CN); Xin Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 105 days.

(21) Appl. No.: 12/534,791

(22) Filed: Aug. 3, 2009

(65) Prior Publication Data

US 2010/0103603 A1    Apr. 29, 2010

(30) Foreign Application Priority Data

Oct. 29, 2008  (CN) .......................... 2008 10 305273

(51) Int. Cl.
  G06F 1/16   (2006.01)
  G09G 5/00   (2006.01)
  H04M 1/00   (2006.01)
  A47B 81/00  (2006.01)

(52) U.S. Cl. .............. 361/679.58; 361/679.55; 345/156; 345/905; 455/575.1; 455/575.4; 312/223.2; 248/917

(58) Field of Classification Search .......... 361/679.55–679.59, 679.01–679.45; 248/917–924; 345/156, 157, 168, 169, 905; 455/575.1, 575.3, 575.4; 16/221–392; 312/223.1, 312/223.2

See application file for complete search history.

(56) References Cited

U.S. PATENT DOCUMENTS

| | | | | |
|---|---|---|---|---|
| 5,103,376 A | * | 4/1992 | Blonder ................... | 361/679.09 |
| 5,494,447 A | * | 2/1996 | Zaidan ..................... | 439/31 |
| 5,900,848 A | * | 5/1999 | Haneda et al. ............ | 345/1.1 |
| 6,229,693 B1 | * | 5/2001 | Karidis et al. ........... | 361/679.05 |
| 6,262,885 B1 | * | 7/2001 | Emma et al. ............. | 361/679.05 |
| 6,295,038 B1 | * | 9/2001 | Rebeske .................. | 345/1.1 |
| 6,504,707 B2 | * | 1/2003 | Agata et al. ............. | 361/679.05 |
| 6,532,147 B1 | * | 3/2003 | Christ, Jr. ................ | 361/679.27 |
| 6,827,409 B2 | * | 12/2004 | Michael .................... | 312/223.3 |
| 7,065,835 B2 | * | 6/2006 | Kuramochi ............... | 16/357 |
| 7,068,258 B2 | * | 6/2006 | Cone et al. ............... | 345/169 |
| 2008/0026803 A1 | * | 1/2008 | Demuynck ............... | 455/575.1 |

* cited by examiner

Primary Examiner — Jayprakash N Gandhi
Assistant Examiner — Nidhi Desai
(74) Attorney, Agent, or Firm — Altis Law Group, Inc.

(57) ABSTRACT

An electronic device includes a cover, a body, and two connection members. The cover is movably connected to the body via the two connection members. Each connection member includes a first sliding rail, a second sliding rail, a hinge, at least three securing members, and at least two limiting members. The first sliding rail is pivotally connected to the second sliding rail via the hinge. The first sliding rail is slidably connected to the cover via a securing member. The second sliding rail is slidably connected to the body via two securing members. The at least two limiting members, mounted between the first sliding rail and the cover, are configured for limiting a sliding range of the cover.

10 Claims, 8 Drawing Sheets

ELECTRONIC DEVICE

BACKGROUND

1. Technical Field

The disclosure generally relates to electronic devices, and particularly to an electronic device having two rotatably connected portions.

2. Description of Related Art

Portable electronic devices, such as notebooks, are widely used in people's daily life. A notebook generally includes a front cover and a body. A display module may be mounted in the front cover. The front cover is rotatable relative to the body to switch between a folded position or an unfolded position. The unfolded position is adjustable. In use, users can adjust rotation angles of the front cover to set a suitable unfolded position according to personal requirements. However, users cannot adjust the height of the cover relative to the body. Therefore, what is needed is an electronic device capable of adjusting the height of the cover relative to the body.

BRIEF DESCRIPTION OF THE DRAWINGS

The components of the drawings are not necessarily drawn to scale, the emphasis instead being placed upon clearly illustrating the principles of the embodiments of an electronic device. Moreover, in the drawings, like reference numerals designate corresponding parts throughout several views.

DETAILED DESCRIPTION

Figure 1:
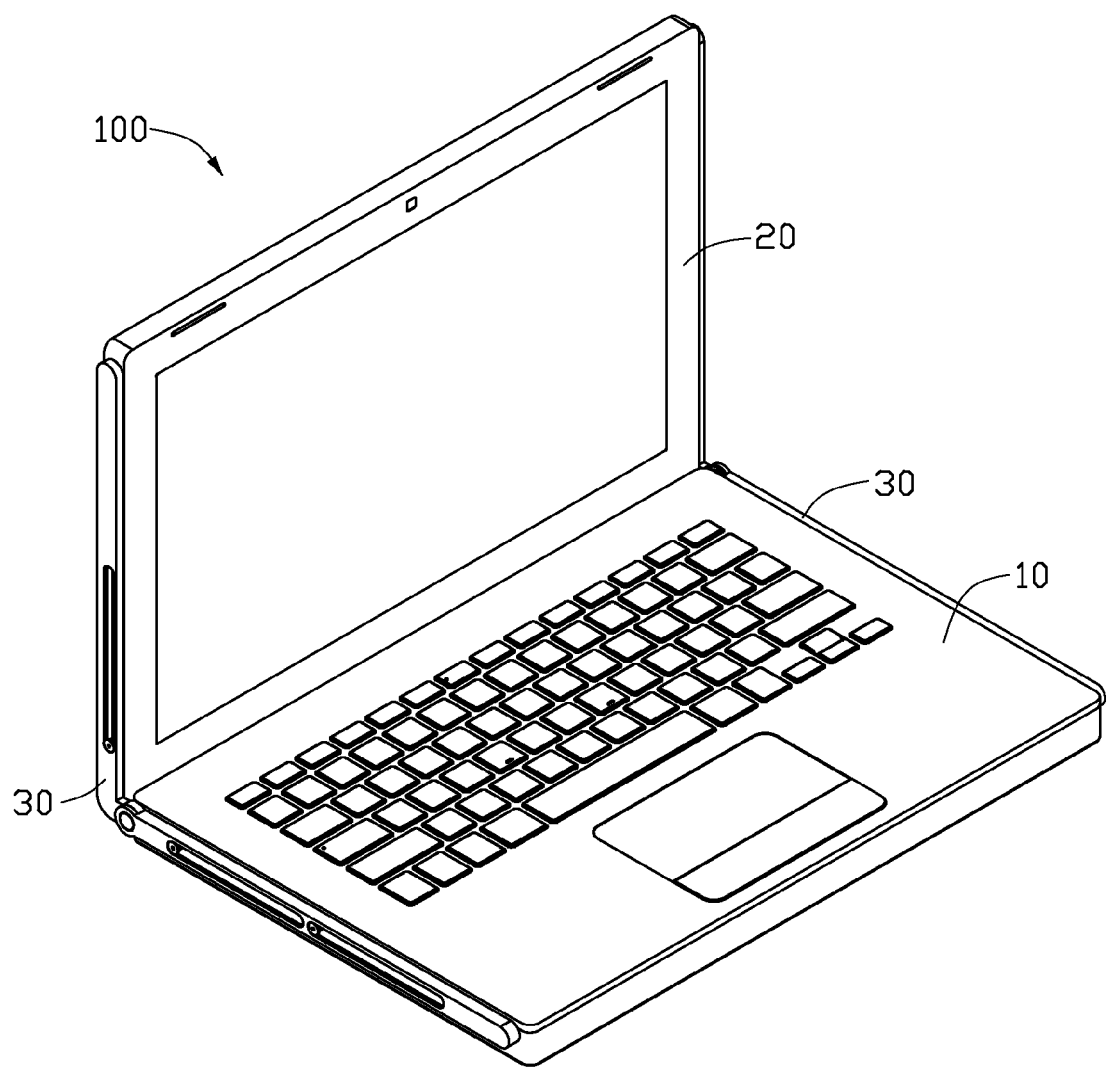
FIG. 1 is a perspective view of an electronic device having a cover and a body in accordance with one embodiment.
Figure 2:
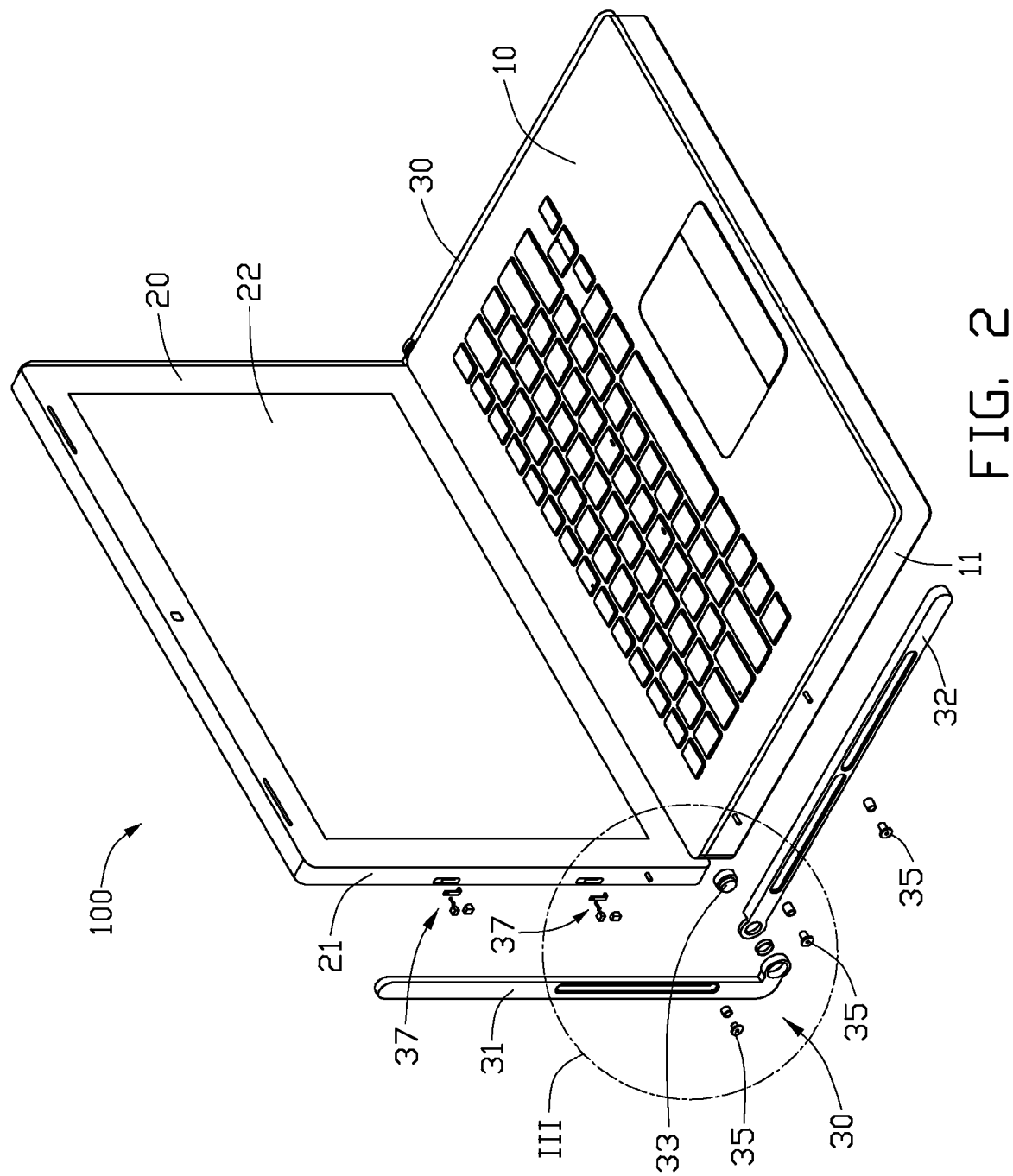
FIG. 2 is a partially exploded view of the electronic device of FIG. 1.
Figure 3:
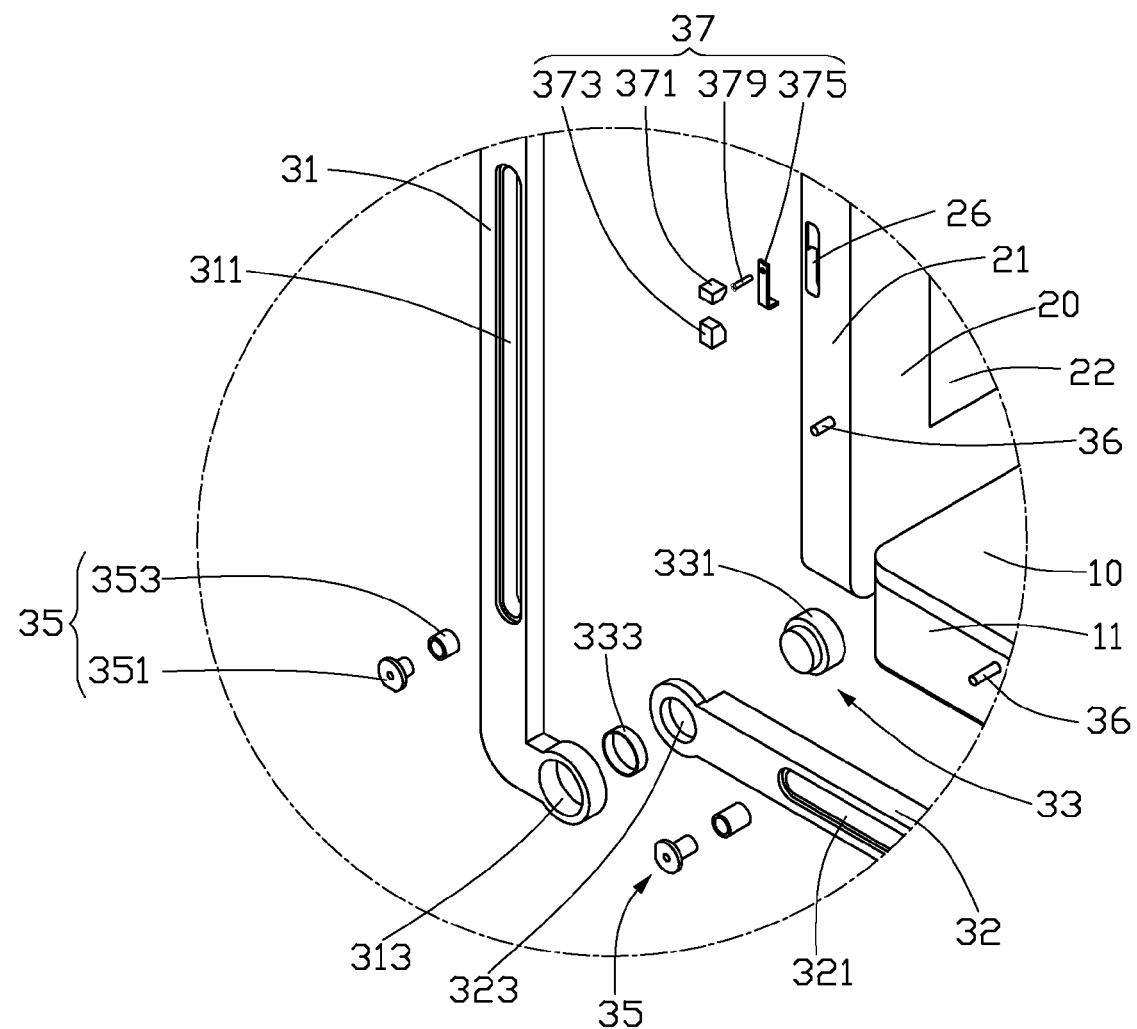
FIG. 3 is an enlarged view enlarging the portion III of the electronic device shown in FIG. 2.
Figure 4:
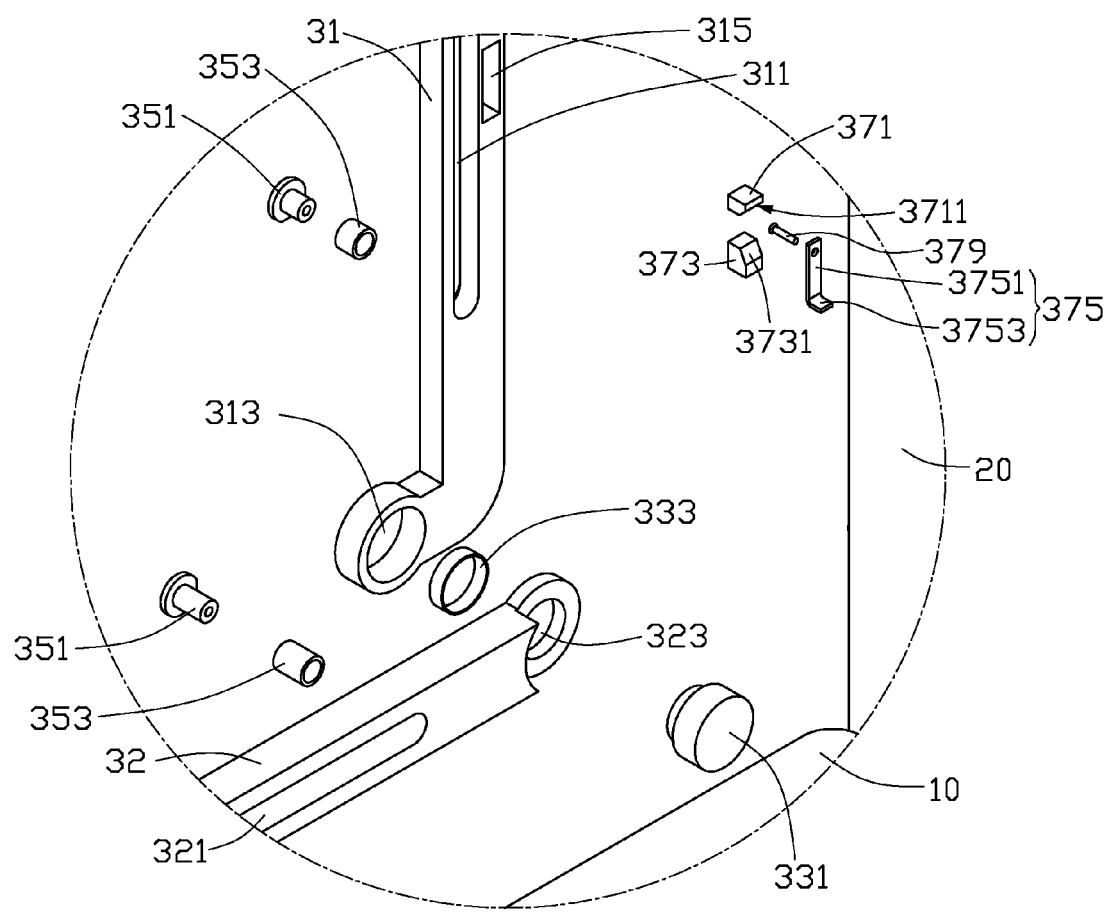
FIG. 4 is also an enlarged view similar to FIG. 3, but viewed from another aspect.

Referring to FIGS. 1 to 4, an electronic device 100 includes a body 10, a cover 20, and two connecting members 30. The cover 10 is rotatably and movably connected to the body 10 via the connecting members 30. In one embodiment, the electronic device 100 is a laptop computer. The two connecting members are attached to opposite sidewalls 11 and 21 of the body 10 and the cover 20, respectively. Each sidewall 21 of the cover 20 defines two receiving spaces 26, and one or more fixing members 36 protruding from the sidewalls. Other two fixing members 36 protrude from each sidewall 11 of the body 10.

Each connecting member 30 includes a first sliding rail 31, a second sliding rail 32, a hinge 33, three securing members 35, and two limiting members 37. Both the first sliding rail 31 and the second rail 32 generally have an elongated strip shape. The first sliding rail 31 is pivotally connected to the second sliding rail 32 via the hinge 33. An elongated first strip guiding slot 311 is defined in the first sliding rail 31, and other two elongated strip guiding slots 321 are defined in the second sliding rail 32. The first sliding rail 31 is slidably connected to the cover 20 via a securing member 35 slidably received in the first guiding slot 311. The second sliding rail 32 is slidably connected to the body 10 via two securing members 35 slidably received in the second guiding slots 321, respectively. The limiting member 37 is disposed between the first sliding rail 31 and a sidewall 21 of the cover 20 and is configured to limit the sliding range of the cover 20. Furthermore, each of the limiting members 37 is partly received in the corresponding receiving space 26 of the cover 20. In other embodiment, the number of the securing members 35 and the limiting members 37 can be different.

A first round hole 313 is defined at one end of the first sliding rail 31. Two limiting recesses 315 are defined in an inner side of the first sliding rail 31 and configured to receive the corresponding limiting members 37.

A second round hole 323 is defined at one end of the second guiding slot 32. The hinge 33, pivotally assembled in the first round hole 313 and the second round hole 323, includes a pivot rod 331 and a bearing 333 placed around the pivot rod 331.

Each of the securing members 35 includes a screw 351 and a sleeve 353 placed around the screw 351. Each limiting member 37 includes a first stopper block 371, a second stopper block 373, and an elastic member or spring clip 375.

Both the first stopper block 371 and the second stopper block 373 have a slope surface 3711 and 3731. The two slope surfaces are slopped to each other and facing substantially the same side towards the cover 21. Either the first stopper block 371 or the second stopper block 373 is a magnet, and the other can be a magnet or a metal, accordingly, a magnetism is existed between the first stopper block 371 and the second stopper block 373. In the embodiment, the magnetism is greater than the gravity of the second stopper block 373, therefore, the second stopper block 373 can be attached to the first stopper block 371 vertically.

The spring clip 375 includes a first strip portion 3751, and a V-shape second portion 3753 extending from a end of the first strip portion 3751. The first portion 3751 is fixed on the sidewall 21 near the top of the receiving space 26, the second portion 3753 is exposed outside of the receiving space 26 when the spring clip 375 is in a natural state, and is received inside of the receiving space 26 when the spring clip 375 is in an elastically deformed state.

Figure 6:
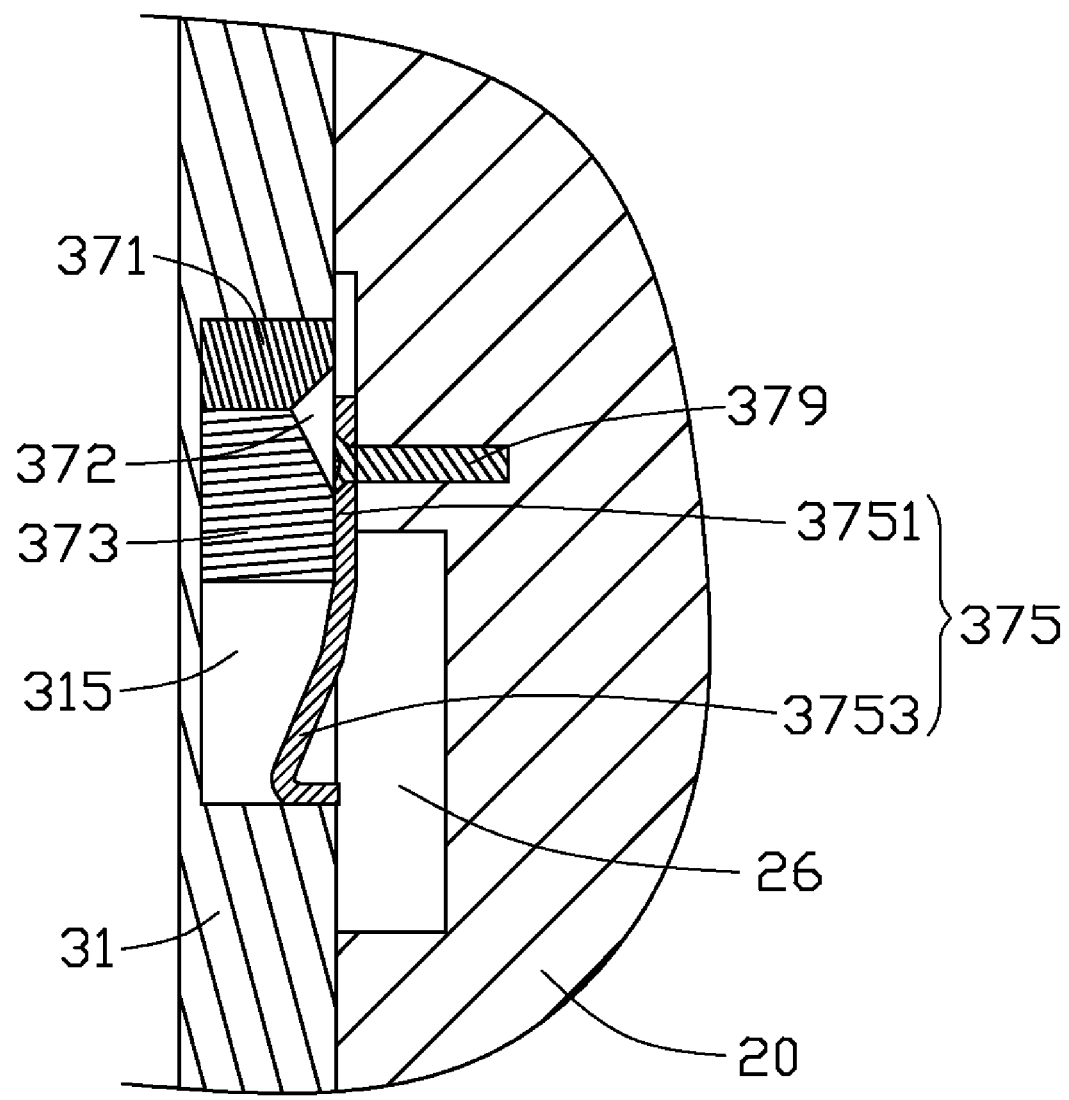
FIG. 6 is a cross-sectional view taken along the line VI-VI of FIG. 5, showing the limiting member of the electronic device in a first position.

In assembly, the first sliding rail 31 is pivotally connected to the second sliding rail 32 by extending the pivot rod 331 through the second round hole 323, the bearing 333, and the first round hole 31 in sequence. Referring to FIG. 6, the spring clip 375 is fixed on the sidewall 21 of the cover 20 via a blot 379, the first stopper block 371 is fixed to the top end of the limiting recess 315, and the second stopper block 373 is placed in the limiting recess 315. The screw 351 extends through the sleeve 353 and either one of the first guiding slot 311 and the second guiding slot 321 in turn and engages with the fixing members 36. Accordingly, the cover 20 is connected to the body 10 via the connection member 30.

Figure 5:
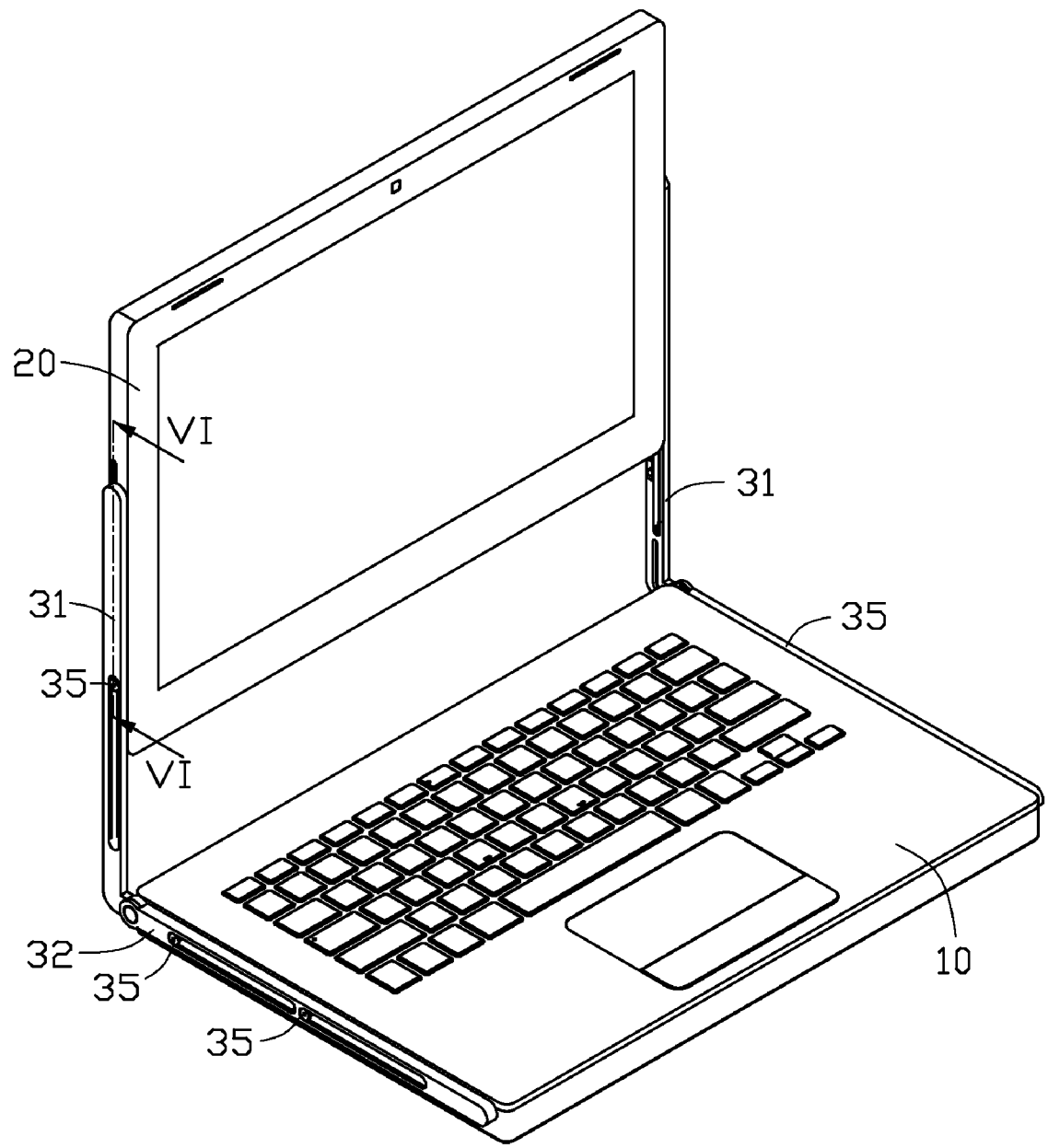
FIG. 5 is a perspective view of the electronic device of FIG. 1, the cover being heightened relative to the body.

Referring to FIGS. 5 and 6, the cover 20 is supported by the sliding rails 31 engaged with the limiting members 37, with the cover 20 located in a first heightened position. At this position, the second stopper block 373 is attached to the first stopper block 371. A V-shaped groove 372 is formed by the cooperation of the two slope surface 3711 and 3731. The second portion 3753 of the spring clip 375 is received in the limiting recess 315 and is below the second stopper block 373. As the second portion 3753 is stopped by the bottom of the limiting recess 315, accordingly, the cover 20 is located in the first heightened position.

Figure 7:
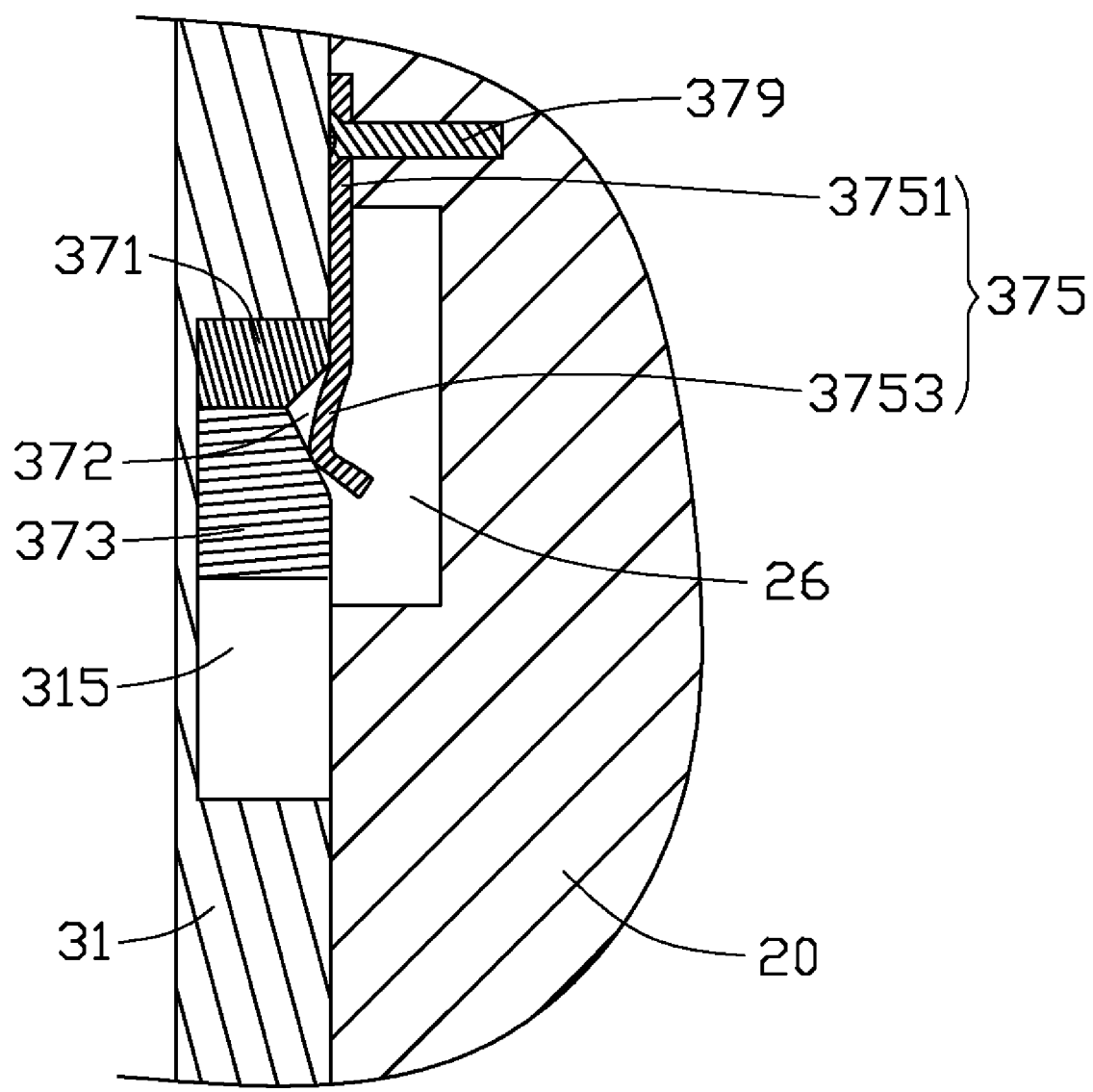
FIG. 7 is a cross-sectional view taken along the line VI-VI of FIG. 5, showing the limiting member of the electronic device in a second position.

Referring to FIG. 7, when the cover 20 is further heightened or lifted away from the body 10 to be located in a second heightened position. The sprig clip 375 is elastically deformed by the press of the sliding rails 31, and the second portion 3753 is received in the receiving space 26. The cover 20 slides upwards along the sliding rails 31. When each limiting member 37 reaches another limiting recess 315, the state of the limiting member 37 is the same to the state shown in the FIG. 6.

Figure 8:
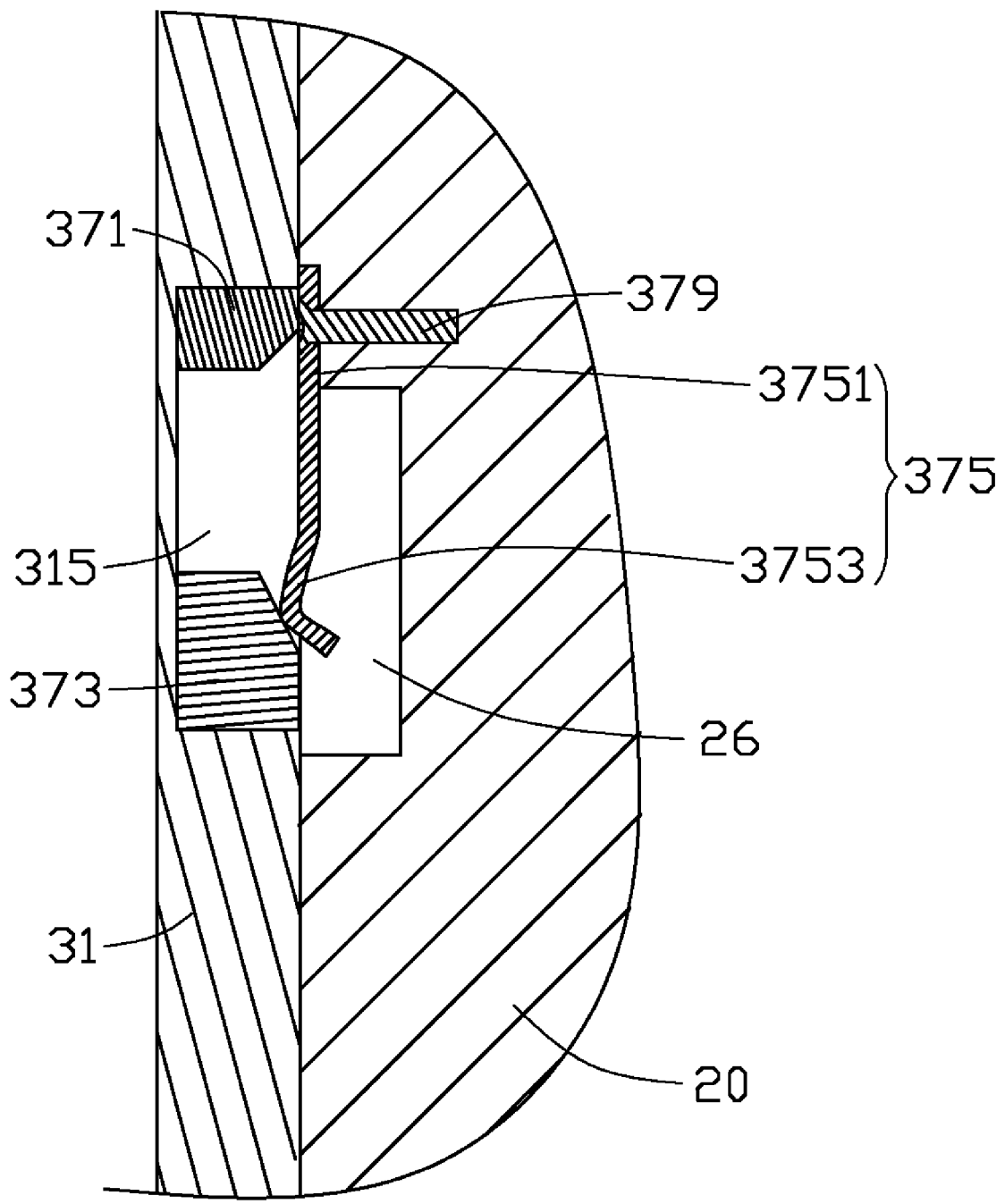
FIG. 8 is a cross-sectional view taken along the line VI-VI of FIG. 5, showing the limiting member of the electronic device in a third position.

Referring to FIG. 8, when the cover 20 is lowered or pulled down from the second heightened position, the spring clip 375 is driven to pass the limiting recess 315, and the second portion 3753 is driven to press the slope surface 3731, as a result, the second stopper block 373 slides to the bottom of the limiting recess 315. After the second portion 3753 of the spring clip 375 has passed the limiting recess 315, the second stopper block 373 is attached to the first stopper block 371 again.

Furthermore, as each second sliding rail 32 is slidably connected to the body 20 via two securing members 35, accordingly, the body 20 is slidable along the second sliding rails 32 in horizontal directions. Therefore, user can watch the cover 20 at different distances and in different heights with respect to the user while operating the body 10 of the electronic device 100.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. An electronic device, comprising:
    a cover;
    a body; and
    two connection members connecting the cover to the body, each of two connection members comprising a first sliding rail, at least one securing member, a hinge, and at least one limiting member;
    wherein the first sliding rail is pivotally connected to the body via the hinge, the first sliding rail is slidably connected to the cover via the at least one securing members, the at least one limiting member is disposed between each first sliding rail and the cover for limiting a sliding range of the cover, and each limiting member comprises a first stopper block, a second stopper block magnetically attracted to the first stopper block, and a spring clip, the first stopper block and the second stopper block are assembled in the first sliding rail, the spring clip is fixed in a sidewall of the cover.

2. The electronic device as described in claim 1, wherein at least two limiting recesses are defined in a sidewall of the first sliding rail, each of which is configured to receive the first stopper block and the second stopper block, and at least one receiving spaces are defined in a sidewall of the cover corresponding to the first sliding rail for receiving the spring clip while in a elastically deformed state.

3. The electronic device as described in claim 2, wherein the spring clip comprises a first portion fixed on the sidewall of the cover adjacent to a corresponding receiving space, and a second portion, the second portion is exposed outside of the receiving space in a natural state and is received in the receiving space when in an elastically deformed state.

4. The electronic device as described in claim 1, wherein both the first stopper block and the second stopper block comprise a slope surface, the two slope surfaces are slopped towards each other.

5. The electronic device as described in claim 1, wherein both the first stopper block and the second stopper block are magnet.

6. The electronic device as described in claim 1, wherein at least one of the first stopper block and the second stopper block is magnet, and the other is metal, magnetism is generated between the first stopper block and the second stopper block, the magnetism is greater than the gravity of one of the two stopper blocks which is arranged at a vertically lower position relative to the other stopper block.

7. The electronic device as described in claim 1, wherein a first round hole is defined in the first sliding rail, the hinge is pivotally assembled in the first round hole.

8. An electronic device, comprising:
    a cover;
    a body; and
    two connection members connecting the cover to the body, each of two connection members comprising a first sliding rail, at least one securing member, a hinge, and at least one limiting member;
    wherein the first sliding rail is pivotally connected to the body via the hinge, the first sliding rail is slidably connected to the cover via the at least one securing members, the at least one limiting member is disposed between each first sliding rail and the cover for limiting a sliding range of the cover, and each of the connection members further comprises a second sliding rail, a second guiding slot is defined in the second sliding rail and have an elongated strip shape, a second round hole is defined at one end of the second guiding slot for connecting with the hinge.

9. The electronic device as described in claim 8, wherein the first sliding rail is pivotally coupled to the second sliding rail via the hinge.

10. The electronic device as described in claim 8, wherein the second rail is slidably coupled to the body by extending two securing members through the second guiding slot.

* * * * *